US012623795B2

(12) United States Patent
Nagi

(10) Patent No.: US 12,623,795 B2
(45) Date of Patent: May 12, 2026

(54) SYSTEM AND METHOD FOR DEPLOYMENT OF SPACE VEHICLE SOLAR ARRAY

(71) Applicant: NETWORK ACCESS ASSOCIATES LIMITED, London (GB)

(72) Inventor: Manraj Nagi, London (GB)

(73) Assignee: NETWORK ACCESS ASSOCIATES LIMITED, London (GB)

( * ) Notice: Subject to any disclaimer, the term of this patent is extended or adjusted under 35 U.S.C. 154(b) by 0 days.

(21) Appl. No.: 18/812,377

(22) Filed: Aug. 22, 2024

(65) Prior Publication Data

US 2024/0409241 A1     Dec. 12, 2024

Related U.S. Application Data

(63) Continuation of application No. PCT/IB2023/000093, filed on Feb. 24, 2023.

(51) Int. Cl.
B64G 1/44     (2006.01)
B64G 1/22     (2006.01)

(52) U.S. Cl.
CPC ........... B64G 1/443 (2013.01); B64G 1/2224 (2023.08); B64G 1/2226 (2023.08); B64G 1/2229 (2023.08)

(58) Field of Classification Search
CPC .. B64G 1/2222; B64G 1/2224; B64G 1/2229; B64G 1/222
See application file for complete search history.

(56) References Cited

U.S. PATENT DOCUMENTS

| | | | | |
|---|---|---|---|---|
| 3,635,425 A | | 1/1972 | Swet | |
| 4,133,502 A | * | 1/1979 | Anchutin | B64G 1/2229 |
| | | | | 244/172.6 |
| 4,630,791 A | * | 12/1986 | Chapman | B64G 1/443 |
| | | | | 244/172.6 |

(Continued)

FOREIGN PATENT DOCUMENTS

| | | | | |
|---|---|---|---|---|
| FR | 2768400 A1 | * | 3/1999 | B64G 1/2229 |
| GB | 2103011 B | * | 3/1985 | B64G 1/222 |

OTHER PUBLICATIONS

International Search Report and Written Opinion to corresponding International Application No. PCT/IB2023/000093, mailed Jul. 18, 2023, 10 pages.

*Primary Examiner* — Joseph W Sanderson
(74) *Attorney, Agent, or Firm* — CUSHMAN PARTNERS, LLC

(57) ABSTRACT

A system, including: a satellite; a first solar array including a first solar panel; a second solar array including a second solar panel; a boom having a first end and a second end opposite the first end, where the first end connects to the satellite; and a bracket assembly, where the bracket assembly has a first, second, and third brackets, where the first bracket connects the first solar array to the third bracket, where the second bracket connects the second solar array to the third bracket, and where the third bracket connects the first bracket and the second bracket to the second end of the boom; where the bracket assembly is configured to reorient the first solar array and the second solar array between a stowed position to a deployed position, and where in the deployed position, the first and second solar arrays are oriented at a predetermined angle.

18 Claims, 6 Drawing Sheets

(56)  References Cited

U.S. PATENT DOCUMENTS

| | | | |
|---|---|---|---|
| 4,832,113 A * | 5/1989 | Mims | B64G 1/503 |
| | | | 165/41 |
| 5,228,644 A | 7/1993 | Garriott et al. | |
| 5,527,001 A * | 6/1996 | Stuart | B64G 1/2224 |
| | | | 244/172.6 |
| 5,660,644 A | 8/1997 | Clemens | |
| 6,050,526 A * | 4/2000 | Stribling, Jr. | B64G 1/443 |
| | | | 244/172.8 |
| 6,637,702 B1 * | 10/2003 | McCandless | B64G 1/2229 |
| | | | 244/172.6 |
| 7,275,285 B1 * | 10/2007 | Lorell | B64G 1/222 |
| | | | 16/286 |
| 8,894,017 B1 * | 11/2014 | Baghdasarian | B64G 1/44 |
| | | | 244/172.6 |
| 9,004,409 B1 * | 4/2015 | Baghdasarian | B64G 1/22 |
| | | | 244/172.6 |
| 9,048,530 B2 * | 6/2015 | Kellberg | B64G 1/44 |
| 10,005,571 B2 * | 6/2018 | Marks | B64G 1/2226 |
| 10,259,599 B2 * | 4/2019 | Hart, III | B64G 1/2225 |
| 10,340,843 B2 * | 7/2019 | Cruijssen | H02S 30/20 |
| 10,532,830 B2 * | 1/2020 | Busche | B64G 1/10 |
| 11,760,510 B1 * | 9/2023 | Wu | B64G 1/2224 |
| | | | 244/171.7 |
| 11,858,663 B2 * | 1/2024 | Strzelecki | B64G 1/2228 |
| 2012/0227916 A1 * | 9/2012 | Kellberg | H01Q 21/061 |
| | | | 160/405 |
| 2016/0159500 A1 | 6/2016 | Marks et al. | |
| 2017/0063296 A1 * | 3/2017 | Cruijssen | H10F 77/488 |
| 2017/0158357 A1 * | 6/2017 | Hart, III | B64G 1/66 |
| 2023/0150694 A1 * | 5/2023 | Strzelecki | H01Q 15/161 |
| | | | 244/158.4 |

* cited by examiner

SYSTEM AND METHOD FOR DEPLOYMENT OF SPACE VEHICLE SOLAR ARRAY

FIELD OF THE INVENTION

The field of the invention relates to space vehicles, and, more particularly, to space vehicles, such as satellites, with solar arrays.

BACKGROUND OF THE INVENTION

Space vehicles such as satellites typically utilize solar arrays to generate electricity for the operation of vehicle systems. Solar arrays generate an amount of electricity that is roughly in proportion to their surface area. Thus, solar arrays are typically positioned in a stowed position for launch in order to provide sufficient launch performance and are then deployed after the vehicle has reached a suitable location in space.

SUMMARY OF THE INVENTION

The Claims, rather than the Summary, define covered embodiments of the present invention. The Summary is a high-level overview of various aspects of the invention, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, a space vehicle includes a body; an extendable boom coupled to the body; a bracket coupled to an end of the extendable boom opposite the body; and a solar array coupled to the bracket; wherein the bracket is configured to position the solar array at a desired orientation.

In some embodiments, the present invention provides a system, comprising: a satellite; a first solar array, wherein the first solar array comprises at least a first solar panel; a second solar array, wherein the second solar array comprises at least a second solar panel; a boom having a first end and a second end opposite the first end, wherein the first end connects to the satellite; and a bracket assembly, wherein the bracket assembly comprise a first bracket, a second bracket, and a third bracket, wherein the first bracket connects the first solar array to the third bracket, wherein the second bracket connects the second solar array to the third bracket, and wherein the third bracket connects the first bracket and the second bracket to the second end of the boom, wherein the bracket assembly is configured to reorient the first solar array and the second solar array from a stowed position to a deployed position, and wherein in the deployed position, the first and second solar arrays are oriented at a predetermined angle.

In some embodiments, the boom comprises an extendable boom.

In some embodiments, the extendible boom comprises at least one telescoping tube.

In some embodiments, the extendible boom comprises a plurality of telescoping tubes.

In some embodiments, the first solar array further comprises a third solar panel, and the third solar panel is foldable relative to the first solar panel.

In some embodiments, the second solar array further comprises a fourth solar panel, and the fourth solar panel is foldable relative to the second solar panel.

In some embodiments, the satellite has a zenith side and an earth side, wherein the zenith side is configured to face away from the earth when the satellite is in orbit around the earth, wherein the earth side is configured to face toward the earth when the satellite is in orbit around the earth, and the first end of the boom is connected to the zenith side of the satellite.

In some embodiments, the bracket assembly further comprises a biasing mechanism, wherein the biasing mechanism is configured to bias at least one of the first bracket and the second bracket to the deployed position.

In some embodiments, the biasing mechanism comprises a spring-biasing mechanism, wherein the spring-biasing mechanism comprises at least one spring urging the first bracket and the second bracket to the deployed position.

In some embodiments, the bracket assembly further comprises at least one motor, wherein the at least one motor is operable to position at least one of the first solar array and the second solar array to the deployed position.

In some embodiments, the bracket assembly further comprises two motors, wherein one of the motors is operable to position the first solar array to the deployed position, and the other motor is operable to position the second solar array to the deployed position.

In some embodiments, the first bracket comprises a first section and a second section angled relative to the first section.

In some embodiments, an angle between the first section and the second section is an acute angle.

In some embodiments, the second bracket comprises a third section and a fourth section angled relative to the third section.

In some embodiments, an angle between the third section and the fourth section is an obtuse angle.

In some embodiments, the present invention provides a method, comprising: deploying a system to a predetermined altitude, wherein the system comprises: a satellite; a first solar array, wherein the first solar array comprises at least a first solar panel; a second solar array, wherein the second solar array comprises at least a second solar panel; a boom having a first end and a second end opposite the first end, wherein the first end connects to the satellite; and a bracket assembly, wherein the bracket assembly comprise a first bracket, a second bracket, and a third bracket, wherein the first bracket connects the first solar array to the third bracket, wherein the second bracket connects the second solar array to the third bracket, and wherein the third bracket connects the first bracket and the second bracket to the second end of the boom; reorienting the first bracket and the second bracket, thereby to move the first solar array and the second solar array from a stowed position to a deployed position, wherein in the deployed position, the first and second solar arrays are oriented at a predetermined angle.

In some embodiments, the predetermined angle is between 15 and 45 degrees from zenith.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION OF THE INVENTION

Figure 1:
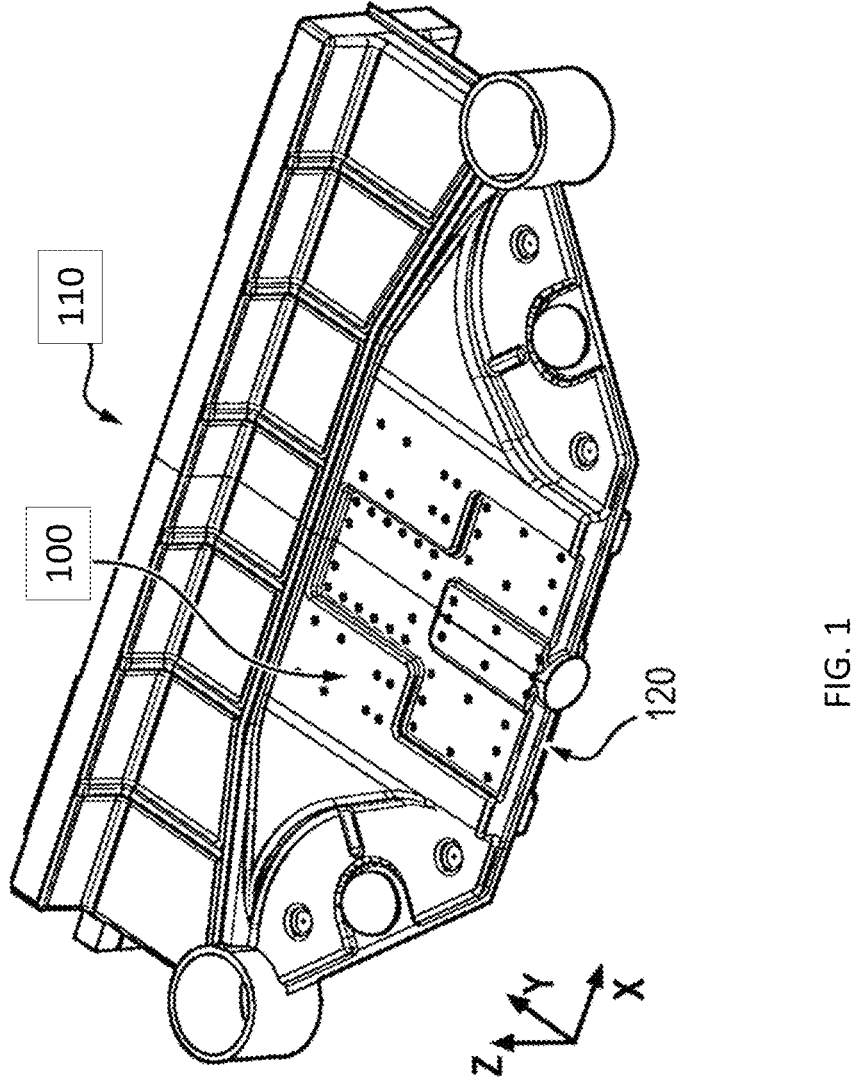
FIG. 1 shows a perspective view of a space vehicle in accordance with some embodiments of the invention.

In addition to the benefits and improvements that the Specification discloses, other objects and advantages of that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

In some embodiments, the present invention provides a system, comprising: a satellite, a first solar array; a second solar array, a boom having a first end and a second end opposite the first end, wherein the first end connects to the satellite; and a bracket assembly, wherein the bracket assembly comprise a first bracket, a second bracket, and a third bracket, wherein the first bracket connects the first solar array to the third bracket, wherein the second bracket connects the second solar array to the third bracket, and wherein the third bracket connects the first bracket and the second bracket to the second end of the boom, wherein the bracket assembly is configured to reorient the first solar array and the second solar array from a stowed position to a deployed position, and wherein in the deployed position, the first and second solar arrays are oriented at a predetermined angle. In some embodiments, the solar arrays may be oriented at the predetermined angle passively. In some embodiments, the solar arrays may be oriented at the predetermined angle actively. In some embodiments, the solar arrays may be oriented without the use of driving electronics.

In some embodiments, the boom comprises an extendable boom.

In some embodiments, the extendible boom comprises at least one telescoping tube. In some embodiments, the extendible boom comprises a plurality of (for example, two or more) telescoping tubes. In some embodiments, the boom comprise one tube. In some embodiments, the tube or tubes fold. In some embodiments, the tube or tubes comprise an articulation joint, thereby permitting the tube or tubes to fold.

In some embodiments, either or both of the first solar array and/or the second solar array comprises at least one solar panel. In some embodiments, each of the first and second solar arrays comprises multiple solar panels. In some embodiments, the solar panels in the solar arrays are foldable relative to each other.

In some embodiments, the satellite has a zenith side and an earth side, wherein the zenith side is configured to face away from the earth when the satellite is in orbit around the earth, wherein the earth side is configured to face toward the earth when the satellite is in orbit around the earth, and the first end of the boom is connected to the zenith side of the satellite. In some embodiments, the first end of the boom is connected to the earth side of the satellite. In some embodiments, the first end of the boom is connected to another side of the satellite.

In some embodiments, the bracket assembly further comprises a biasing mechanism. In some embodiments, the biasing mechanism is configured to bias at least one of the first bracket and the second bracket to the deployed position. In some embodiments, the biasing mechanism is configured to bias both of the first bracket and the second bracket to the deployed position. In some embodiments, the biasing mechanism comprises a spring-biasing mechanism, and the spring-biasing mechanism comprises at least one spring urging the first bracket and the second bracket to the deployed position. In some embodiments, the bracket assembly omits a biasing mechanism. In some embodiments, the bracket assembly omits a motor.

In some embodiments, the bracket assembly further comprises at least one motor, and the at least one motor is operable to position at least one of the first solar array and the second solar array to the deployed position. In some embodiments, the bracket assembly further comprises one motor, and the motor is operable to position at least one of the first solar array and the second solar array to the deployed position. In some embodiments, the bracket assembly further comprises one motor, and the motor is operable to position both of the first solar array and the second solar array to the deployed position. In some embodiments, the bracket assembly further comprises two motors, and one of the motors is operable to position the first solar array to the deployed position, and the other motor is operable to position the second solar array to the deployed position. In some embodiments, the bracket assembly does not include a motor or motors. In some embodiments, the bracket assembly comprises both a biasing mechanism as well as one or more motors. In some embodiments, the bracket assembly omits a motor.

In some embodiments, the first bracket comprises a first section and a second section angled relative to the first section. In some embodiments, an angle between the first section and the second section is an acute angle. In some embodiments, an angle between the first section and the second section is an angle other than an acute angle.

In some embodiments, the second bracket comprises a third section and a fourth section angled relative to the third section. In some embodiments, an angle between the third section and the fourth section is an obtuse angle. In some embodiments, an angle between the third section and the fourth section is an angle other than an obtuse angle.

In some embodiments, the present invention provides a method, comprising: deploying a system to a predetermined altitude, wherein the system is in accordance with the system, including any or all of the satellite, the arrays, the bracket assembly, as described herein. In some embodiments, the method further comprises reorienting the first bracket and the second bracket, thereby to move the first solar array and the second solar array from a stowed position to a deployed position, wherein in the deployed position, the first and second solar arrays are oriented at a predetermined angle. In some embodiments, the predetermined angle is between 15 and 45 degrees. In some embodiments, the predetermined angle is as described herein.

In some embodiments, the boom may be extended prior to deployment of the solar arrays.

The embodiments described herein relate to systems and methods for deployment of solar arrays of space vehicles, such as but not limited to satellites. Thus, although the disclosure refers to satellites throughout, it is understood that the disclosure is otherwise applicable to other space vehicles.

In some embodiments, the space vehicle has an outer shell. In some embodiments, the outer shell comprises a metal. In some embodiments, the metal comprises a metal alloy. In some embodiments, the metal alloy comprises at least one of an aluminum alloy, a steel alloy, and/or combinations thereof. In some embodiments, the metal alloy comprises an alloy other than steel and/or aluminum. In some embodiments, the outer shell comprises a composite. In some embodiments, the composite comprises a fiber composite. In some embodiments, the fiber composite comprises a carbon fiber composite. In some embodiments, the fiber composite comprises a glass fiber composite. In some embodiments, the outer shell may be formed by a stamping process. In some embodiments, the outer shell may be formed by a material-removal process. In some embodiments, the outer shell may be formed by a molding process. In some embodiments, the outer shell may be formed by an injection process. In some embodiments, the outer shell may be formed by a 3-D printing process.

Figure 2:
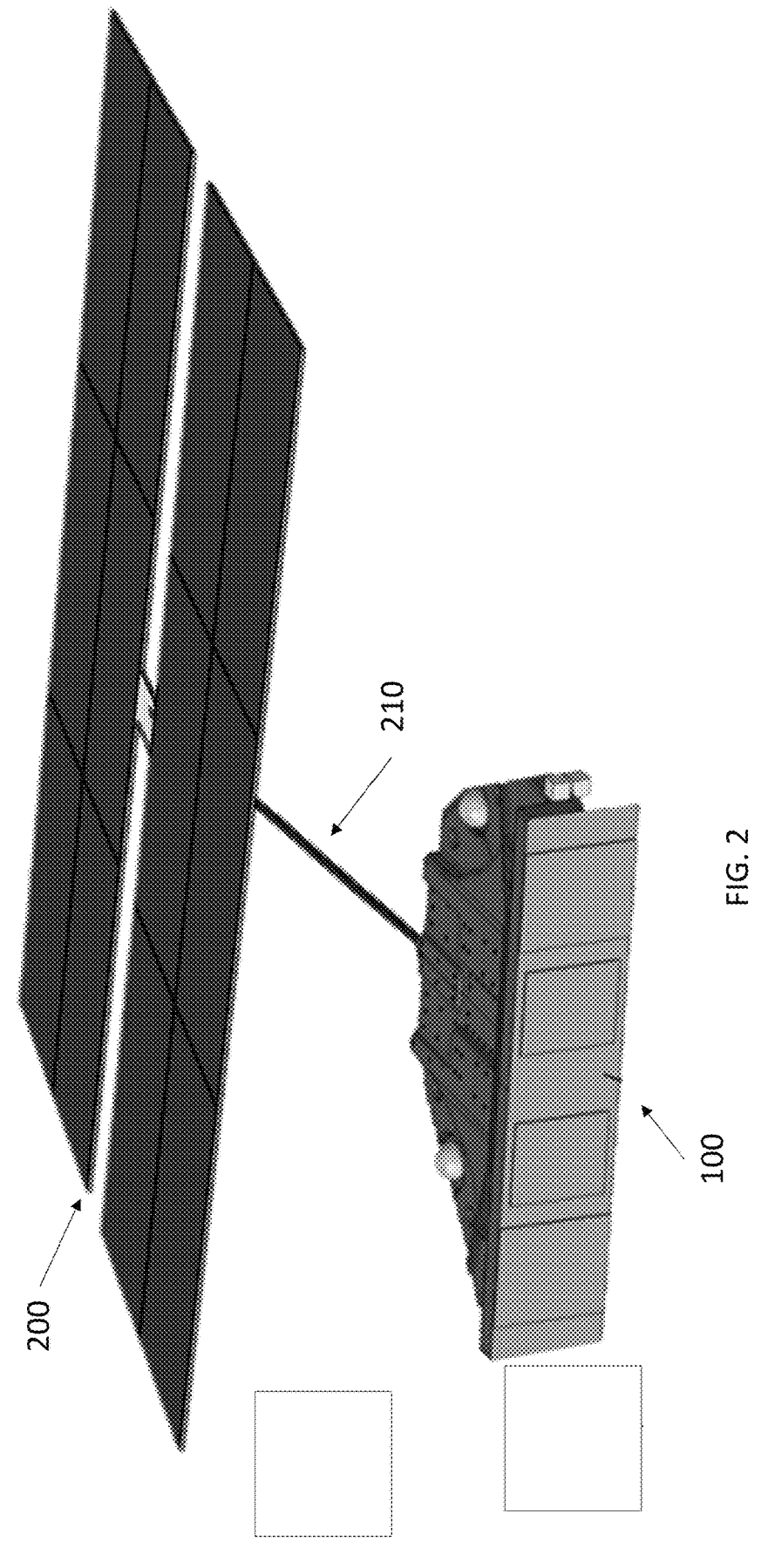
FIG. 2 shows a space vehicle include a solar array deployment system, in accordance with some embodiments of the invention.

FIG. 1 shows an embodiment of a space vehicle, in the form of a satellite 100, in accordance with some embodiments of the invention. In some embodiments, the satellite 100 includes an earth side 110 that is designed and configured to face the earth when the satellite 100 is in orbit. In some embodiments, the satellite 100 includes a zenith side 120 that is designed and configured to face away from the earth when the satellite 100 is in orbit. FIG. 2 shows the satellite 100 with a solar array 200 in a deployed position, in accordance with some embodiments of the invention. In some embodiments, a boom 210 extends from the zenith side 120 of the satellite 100. In some embodiments, the boom 210 may extends from another side of the satellite 100, such as but not limited to the zenith side 120 of the satellite 100. In some embodiments, the solar array 200 is positioned at an end of the boom 210 which is opposite the satellite 100. In some embodiments, the solar array 200 may be positioned at another location on the boom 210, such as disposed apart from the end of the boom 210.

In some embodiments, a solar array deployment system includes at least one bracket that is configured to orient the solar array, when in a deployed position, at a predetermined angle, such as a predetermined angle from zenith when the space vehicle is in orbit around the earth, as further described. In some embodiments, a satellite includes two solar arrays, and the solar array deployment system includes one bracket for each of the two solar arrays. In some embodiments, a satellite includes more than two solar arrays, and the solar array deployment system includes one bracket for each of the solar arrays. In some embodiments, a satellite includes more than one solar array, and the solar array deployment system includes one bracket for all of the solar arrays.

Figure 3A:
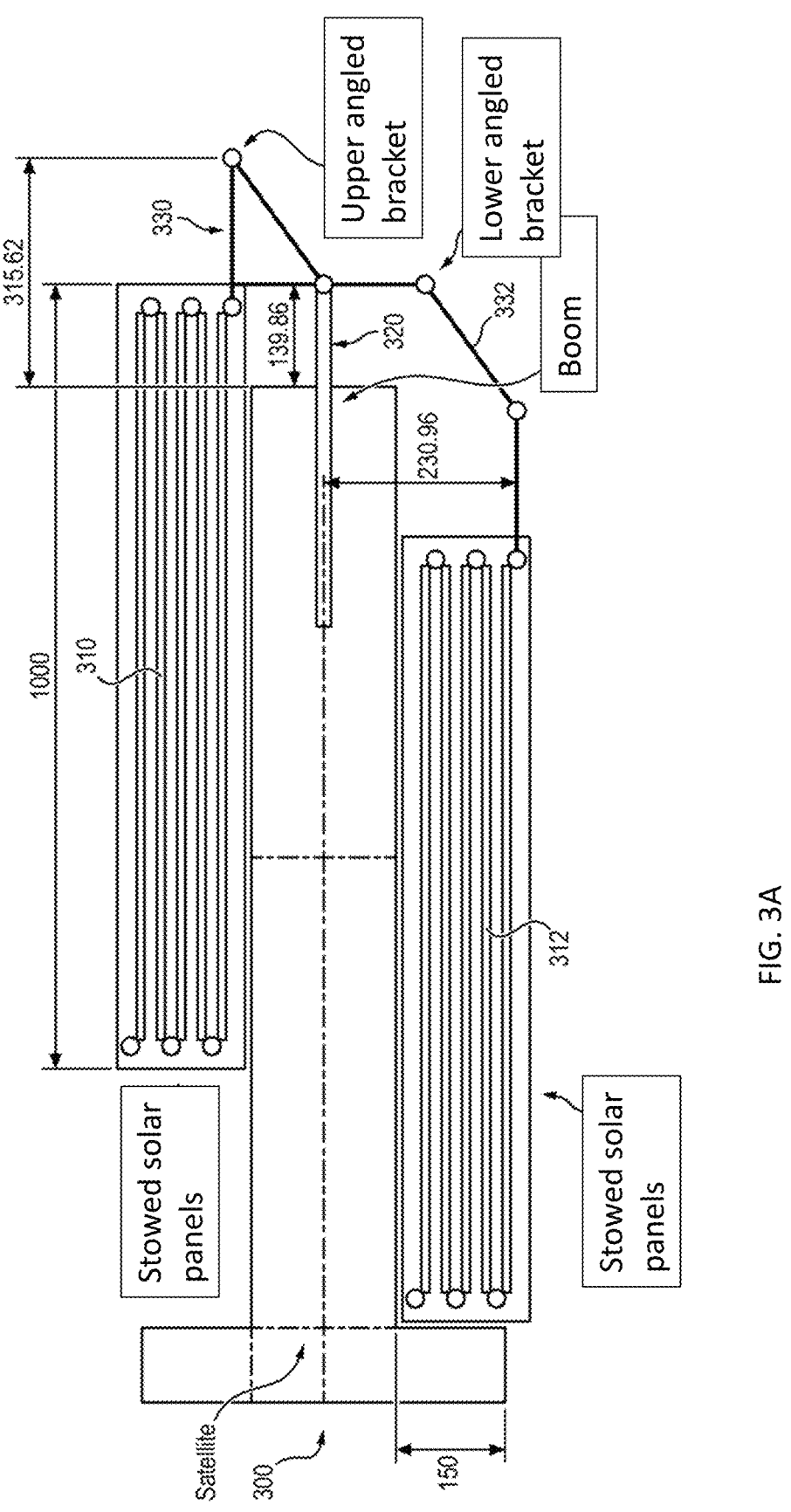
FIG. 3A shows a side view of a space vehicle with solar arrays in a stowed position, in accordance with some embodiments of the invention.
Figure 3B:
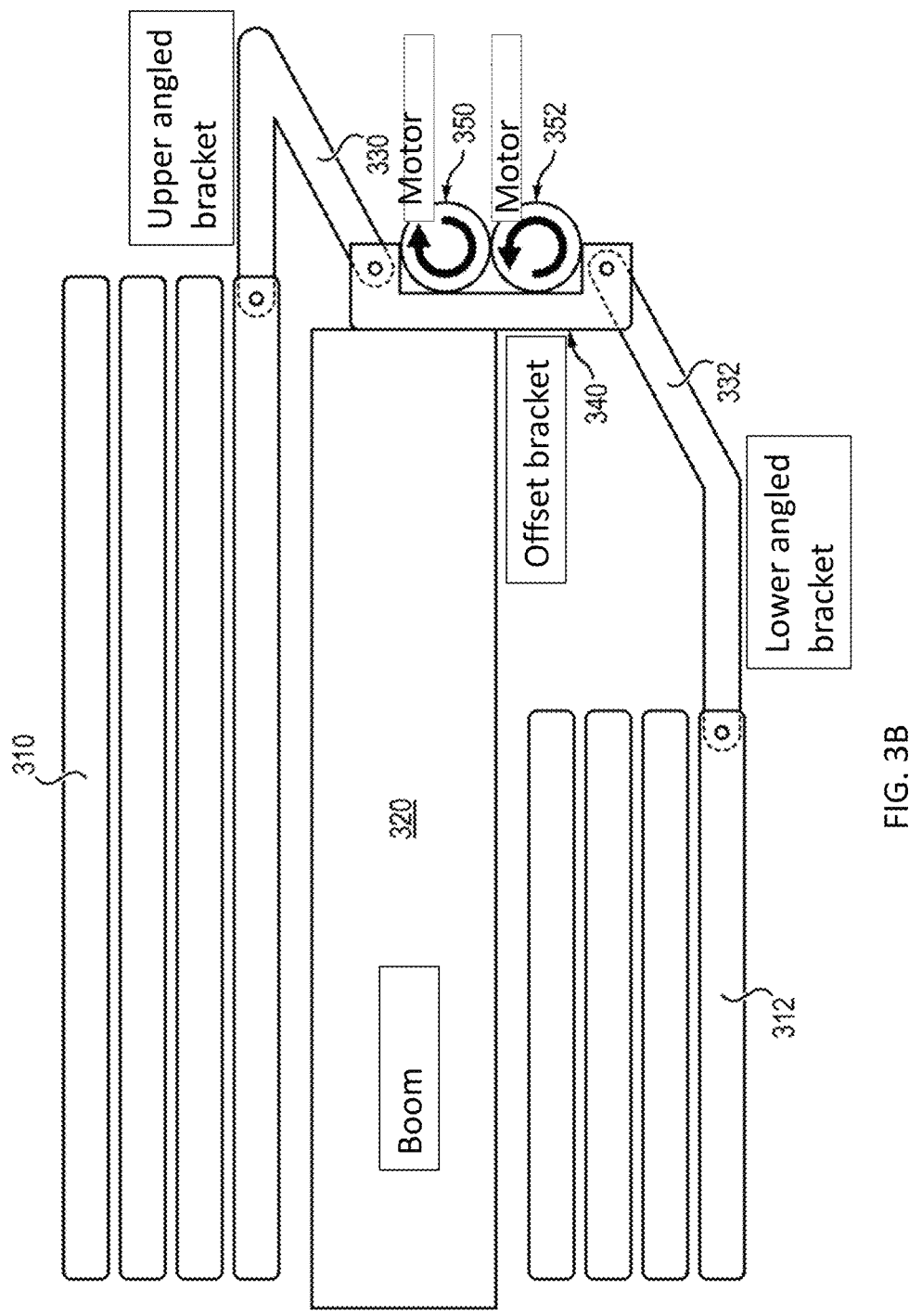
FIG. 3B shows a detail view of a portion of the space vehicle shown in FIG. 3A, in accordance with some embodiments of the invention.

FIG. 3A shows a side view of a satellite 300 including a solar array deployment system in the form of a bracket assembly 313, while FIG. 3B shows a magnified view of portions of the satellite shown in FIG. 3A, in accordance with some embodiments of the invention. As illustrated in FIG. 3A, the satellite 300 is shown with solar panels in a stowed position that is appropriate for stacking and launch of the satellite 300, thereby minimize a volume occupied by the satellite in the fairing of a lunch vehicle, such as a rocket. In some embodiments, the solar array include an upper solar array 310 and a lower solar array 312. In some embodiments, the solar array deployment system includes a boom 320 that is coupled to a zenith side 302 of the satellite 300. In some embodiments, the boom 320 has a first end that is coupled to the zenith side 302 of the satellite, and has a second end that is opposite the first end. In some embodiments, the boom 320 is an extendable boom. In some embodiments, the extendible boom includes one or more telescoping tubes. In some embodiments, the boom 320 includes an inter-tube latching system configured and operable to retain the tubes in the stowed position until a suitable time for deployment. In some embodiments, the boom 320 includes a deployment drive system (e.g., including a motor and/or a biasing system, such as a spring-biasing system) configured and operable to deploy the boom 320.

In some embodiments, the boom 320 has a mass that is less than 5 kilograms (e.g., about 4.5 kilograms). In some embodiments, the boom 320 has a mass that is 5 kilograms or more. In some embodiments, the boom 320, when in the stowed position, fits within a cylindrical space having a length of about 450 mm and a diameter of about 150 mm. In some embodiments, the boom 320, when in the deployed position, has a length of greater than 3.6 meters (e.g., a length of 4 meters). In some embodiments, the boom 320, when in the deployed position, has a length of 3.6 meters or less. In some embodiments, the boom 320 is operable to transition from its stowed position to its deployed position in less than five minutes. In some embodiments, the boom 320 is operable to transition from its stowed position to its deployed position in five minutes or more.

Continuing to refer to FIG. 3A, in some embodiments, the solar array deployment system includes the bracket assembly 313, which may include upper and lower brackets 330 and 332, respectively, positioned at or near the second end of the boom 320. In some embodiments, the solar array deployment system includes the upper solar array 310 coupled to the second end of the boom 320 proximate to the upper bracket 330. In some embodiments, the solar array deployment system includes the lower solar array 312 coupled to the second end of the boom 320 proximate to the lower bracket 332. In some embodiments, the upper solar array 310 and the lower solar array 312 are foldable (e.g., configured to fold). In some embodiments, the upper and lower solar arrays 310, 312 are biased, such as spring-biased, from a folded or stowed position, to an unfolded or deployed position. In some embodiments, the upper and lower solar arrays 310, 312 are locked in a folded position by a locking mechanism when the solar array deployment mechanism is in its stowed position. In some embodiments, the upper and lower solar arrays 310, 312 include the solar cells of the type commercialized under the trade name DRAGONSCALES by mPower Technology of Albuquerque, New Mexico, the solar cells of the type commercialized by Azur Space Solar Power GmbH of Heilbronn, Germany, and/or the solar cells of the type commercialized by SolAero Technologies of Albuquerque, New Mexico.

Referring now to FIG. 3B, in some embodiments, an offset bracket 340 of the bracket assembly 313 separates the upper and lower brackets 330, 332 of the bracket assembly

313. When going from the stowed position or orientation, to the deployed position or orientation, the upper and lower brackets 330, 332, rotate relative to the offset bracket 340.

In some embodiments, the bracket assembly 313 may include respective root motors 350, 352 that are positioned at the base of the upper and lower brackets 330, 332. In some embodiments, the root motors 350, 352 are operable to rotate the upper and lower brackets 330, 332 from the stowed position shown in FIGS. 3A and 3B, to the deployed position discussed hereinafter. In some embodiments, the root motor 350 is operable to rotate the upper bracket 330 from the stowed position to the deployed position, while the root motor 352 is operable to rotate the lower bracket 332 from the stowed position to the deployed position. In some embodiments, only one root motor may be used to rotate both of the upper and lower brackets 330, 332 from the stowed position to the deployed position. In some embodiments, the bracket assembly 313 may omit a root motor.

As shown in FIGS. 3A and 3B, the upper bracket 330 includes a first portion or section 330-1 connecting to the upper solar array 310, and a second portion or section 330-2 connecting to the offset bracket 340, in accordance with some embodiments of the invention. The two portions 330-1 and 330-2 may be angled relative to each other. In some embodiments, the angle between the first portion 330-1 and the second portion 330-2 of the upper bracket 330 may be an acute angle. Also as shown in FIGS. 3A and 3B, the lower bracket 332 includes a first portion or section 332-1 connecting to the upper solar array 310, and a second portion or section 332-2 connecting to the offset bracket 340, in accordance with some embodiments of the invention. The two portion 332-1 and 332-2 may be angled relative to each other. In some embodiments, the angle between the first portion 332-1 and the second portion 332-2 of the upper bracket 330 may be an obtuse angle.

In some embodiments, the acute angle is between from 15 degrees to 45 degrees. In some embodiments, the acute angle is between from 20 degrees to 45 degrees. In some embodiments, the acute angle is between from 25 degrees to 45 degrees. In some embodiments, the acute angle is between from 28 degrees to 45 degrees. In some embodiments, the acute angle is between from 28.5 degrees to 45 degrees. In some embodiments, the acute angle is between from 30 degrees to 45 degrees. In some embodiments, the acute angle is between from 35 degrees to 45 degrees. In some embodiments, the acute angle is between from 40 degrees to 45 degrees.

In some embodiments, the acute angle is between from 15 degrees to 40 degrees. In some embodiments, the acute angle is between from 20 degrees to 40 degrees. In some embodiments, the acute angle is between from 25 degrees to 40 degrees. In some embodiments, the acute angle is between from 28 degrees to 40 degrees. In some embodiments, the acute angle is between from 28.5 degrees to 40 degrees. In some embodiments, the acute angle is between from 30 degrees to 40 degrees. In some embodiments, the acute angle is between from 35 degrees to 40 degrees.

In some embodiments, the acute angle is between from 15 degrees to 35 degrees. In some embodiments, the acute angle is between from 20 degrees to 35 degrees. In some embodiments, the acute angle is between from 25 degrees to 35 degrees. In some embodiments, the acute angle is between from 28 degrees to 35 degrees. In some embodiments, the acute angle is between from 28.5 degrees to 35 degrees. In some embodiments, the acute angle is between from 30 degrees to 35 degrees.

In some embodiments, the acute angle is between from 15 degrees to 30 degrees. In some embodiments, the acute angle is between from 20 degrees to 30 degrees. In some embodiments, the acute angle is between from 25 degrees to 30 degrees. In some embodiments, the acute angle is between from 28 degrees to 30 degrees. In some embodiments, the acute angle is between from 28.5 degrees to 30 degrees.

In some embodiments, the acute angle is between from 15 degrees to 28.5 degrees. In some embodiments, the acute angle is between from 20 degrees to 28.5 degrees. In some embodiments, the acute angle is between from 25 degrees to 28.5 degrees. In some embodiments, the acute angle is between from 28 degrees to 28.5 degrees.

In some embodiments, the acute angle is between from 15 degrees to 28 degrees. In some embodiments, the acute angle is between from 20 degrees to 28 degrees. In some embodiments, the acute angle is between from 25 degrees to 28 degrees.

In some embodiments, the acute angle is between from 15 degrees to 25 degrees. In some embodiments, the acute angle is between from 20 degrees to 25 degrees. In some embodiments, the acute angle is between from 15 degrees to 20 degrees.

In some embodiments, the acute angle is 15 degrees. In some embodiments, the acute angle is 20 degrees. In some embodiments, the acute angle is 25 degrees. In some embodiments, the acute angle is 26 degrees. In some embodiments, the acute angle is 27 degrees. In some embodiments, the acute angle is 28 degrees. In some embodiments, the acute angle is 28.5 degrees. In some embodiments, the acute angle is 29 degrees. In some embodiments, the acute angle is 30 degrees. In some embodiments, the acute angle is 35 degrees. In some embodiments, the acute angle is 40 degrees. In some embodiments, the acute angle is 45 degrees.

In some embodiments, the acute angle is greater than 15 degrees. In some embodiments, the acute angle is greater than 20 degrees. In some embodiments, the acute angle is greater than 25 degrees. In some embodiments, the acute angle is greater than 26 degrees. In some embodiments, the acute angle is greater than 27 degrees. In some embodiments, the acute angle is greater than 28 degrees. In some embodiments, the acute angle is greater than 28.5 degrees. In some embodiments, the acute angle is greater than 29 degrees. In some embodiments, the acute angle is greater than 30 degrees. In some embodiments, the acute angle is greater than 35 degrees. In some embodiments, the acute angle is greater than 40 degrees. In some embodiments, the acute angle is greater than 45 degrees.

In some embodiments, the acute angle is less than 15 degrees. In some embodiments, the acute angle is less than 20 degrees. In some embodiments, the acute angle is less than 25 degrees. In some embodiments, the acute angle is less than 26 degrees. In some embodiments, the acute angle is less than 27 degrees. In some embodiments, the acute angle is less than 28 degrees. In some embodiments, the acute angle is less than 28.5 degrees. In some embodiments, the acute angle is less than 29 degrees. In some embodiments, the acute angle is less than 30 degrees. In some embodiments, the acute angle is less than 35 degrees. In some embodiments, the acute angle is less than 40 degrees. In some embodiments, the acute angle is less than 45 degrees.

In some embodiments, the acute angle is an angle greater than 0 degrees, and less than 90 degrees.

In some embodiments, the obtuse angle is between from 105 degrees to 160 degrees. In some embodiments, the obtuse angle is between from 110 degrees to 160 degrees. In some embodiments, the obtuse angle is between from 115 degrees to 160 degrees. In some embodiments, the obtuse angle is between from 118 degrees to 160 degrees. In some embodiments, the obtuse angle is between from 118.5 degrees to 160 degrees. In some embodiments, the obtuse angle is between from 120 degrees to 160 degrees. In some embodiments, the obtuse angle is between from 125 degrees to 160 degrees. In some embodiments, the obtuse angle is between from 130 degrees to 160 degrees. In some embodiments, the obtuse angle is between from 135 degrees to 160 degrees. In some embodiments, the obtuse angle is between from 140 degrees to 160 degrees. In some embodiments, the obtuse angle is between from 145 degrees to 160 degrees. In some embodiments, the obtuse angle is between from 150 degrees to 160 degrees. In some embodiments, the obtuse angle is between from 155 degrees to 160 degrees.

In some embodiments, the obtuse angle is between from 105 degrees to 155 degrees. In some embodiments, the obtuse angle is between from 110 degrees to 155 degrees. In some embodiments, the obtuse angle is between from 115 degrees to 155 degrees. In some embodiments, the obtuse angle is between from 118 degrees to 155 degrees. In some embodiments, the obtuse angle is between from 118.5 degrees to 155 degrees. In some embodiments, the obtuse angle is between from 120 degrees to 155 degrees. In some embodiments, the obtuse angle is between from 125 degrees to 155 degrees. In some embodiments, the obtuse angle is between from 130 degrees to 155 degrees. In some embodiments, the obtuse angle is between from 135 degrees to 155 degrees. In some embodiments, the obtuse angle is between from 140 degrees to 155 degrees. In some embodiments, the obtuse angle is between from 145 degrees to 155 degrees. In some embodiments, the obtuse angle is between from 150 degrees to 155 degrees.

In some embodiments, the obtuse angle is between from 105 degrees to 150 degrees. In some embodiments, the obtuse angle is between from 110 degrees to 150 degrees. In some embodiments, the obtuse angle is between from 115 degrees to 150 degrees. In some embodiments, the obtuse angle is between from 118 degrees to 150 degrees. In some embodiments, the obtuse angle is between from 118.5 degrees to 150 degrees. In some embodiments, the obtuse angle is between from 120 degrees to 150 degrees. In some embodiments, the obtuse angle is between from 125 degrees to 150 degrees. In some embodiments, the obtuse angle is between from 130 degrees to 150 degrees. In some embodiments, the obtuse angle is between from 135 degrees to 150 degrees. In some embodiments, the obtuse angle is between from 140 degrees to 150 degrees. In some embodiments, the obtuse angle is between from 145 degrees to 150 degrees.

In some embodiments, the obtuse angle is between from 105 degrees to 145 degrees. In some embodiments, the obtuse angle is between from 110 degrees to 145 degrees. In some embodiments, the obtuse angle is between from 115 degrees to 145 degrees. In some embodiments, the obtuse angle is between from 118 degrees to 145 degrees. In some embodiments, the obtuse angle is between from 118.5 degrees to 145 degrees. In some embodiments, the obtuse angle is between from 120 degrees to 145 degrees. In some embodiments, the obtuse angle is between from 125 degrees to 145 degrees. In some embodiments, the obtuse angle is between from 130 degrees to 145 degrees. In some embodiments, the obtuse angle is between from 135 degrees to 145 degrees. In some embodiments, the obtuse angle is between from 140 degrees to 145 degrees.

In some embodiments, the obtuse angle is between from 105 degrees to 140 degrees. In some embodiments, the obtuse angle is between from 110 degrees to 140 degrees. In some embodiments, the obtuse angle is between from 115 degrees to 140 degrees. In some embodiments, the obtuse angle is between from 118 degrees to 140 degrees. In some embodiments, the obtuse angle is between from 118.5 degrees to 140 degrees. In some embodiments, the obtuse angle is between from 120 degrees to 140 degrees. In some embodiments, the obtuse angle is between from 125 degrees to 140 degrees. In some embodiments, the obtuse angle is between from 130 degrees to 140 degrees. In some embodiments, the obtuse angle is between from 135 degrees to 140 degrees.

In some embodiments, the obtuse angle is between from 105 degrees to 135 degrees. In some embodiments, the obtuse angle is between from 110 degrees to 135 degrees. In some embodiments, the obtuse angle is between from 115 degrees to 135 degrees. In some embodiments, the obtuse angle is between from 118 degrees to 135 degrees. In some embodiments, the obtuse angle is between from 118.5 degrees to 135 degrees. In some embodiments, the obtuse angle is between from 120 degrees to 135 degrees. In some embodiments, the obtuse angle is between from 125 degrees to 135 degrees. In some embodiments, the obtuse angle is between from 130 degrees to 135 degrees.

In some embodiments, the obtuse angle is between from 105 degrees to 130 degrees. In some embodiments, the obtuse angle is between from 110 degrees to 130 degrees. In some embodiments, the obtuse angle is between from 115 degrees to 130 degrees. In some embodiments, the obtuse angle is between from 118 degrees to 130 degrees. In some embodiments, the obtuse angle is between from 118.5 degrees to 130 degrees. In some embodiments, the obtuse angle is between from 120 degrees to 130 degrees. In some embodiments, the obtuse angle is between from 125 degrees to 130 degrees.

In some embodiments, the obtuse angle is between from 105 degrees to 125 degrees. In some embodiments, the obtuse angle is between from 110 degrees to 125 degrees. In some embodiments, the obtuse angle is between from 115 degrees to 125 degrees. In some embodiments, the obtuse angle is between from 118 degrees to 125 degrees. In some embodiments, the obtuse angle is between from 118.5 degrees to 125 degrees. In some embodiments, the obtuse angle is between from 120 degrees to 125 degrees.

In some embodiments, the obtuse angle is between from 105 degrees to 120 degrees. In some embodiments, the obtuse angle is between from 110 degrees to 120 degrees. In some embodiments, the obtuse angle is between from 115 degrees to 120 degrees. In some embodiments, the obtuse angle is between from 118 degrees to 120 degrees. In some embodiments, the obtuse angle is between from 118.5 degrees to 120 degrees.

In some embodiments, the obtuse angle is between from 105 degrees to 118.5 degrees. In some embodiments, the obtuse angle is between from 110 degrees to 118.5 degrees. In some embodiments, the obtuse angle is between from 115 degrees to 118.5 degrees. In some embodiments, the obtuse angle is between from 118 degrees to 118.5 degrees.

In some embodiments, the obtuse angle is between from 105 degrees to 118 degrees. In some embodiments, the obtuse angle is between from 110 degrees to 118 degrees. In some embodiments, the obtuse angle is between from 115 degrees to 118 degrees.

In some embodiments, the obtuse angle is between from 105 degrees to 115 degrees. In some embodiments, the obtuse angle is between from 110 degrees to 115 degrees. In some embodiments, the obtuse angle is between from 105 degrees to 110 degrees.

In some embodiments, the obtuse angle is 105 degrees. In some embodiments, the obtuse angle is 110 degrees. In some embodiments, the obtuse angle is 115 degrees. In some embodiments, the obtuse angle is 116 degrees. In some embodiments, the obtuse angle is 117 degrees. In some embodiments, the obtuse angle is 118 degrees. In some embodiments, the obtuse angle is 118.5 degrees. In some embodiments, the obtuse angle is 119 degrees. In some embodiments, the obtuse angle is 120 degrees. In some embodiments, the obtuse angle is 125 degrees. In some embodiments, the obtuse angle is 130 degrees. In some embodiments, the obtuse angle is 135 degrees. In some embodiments, the obtuse angle is 140 degrees. In some embodiments, the obtuse angle is 145 degrees. In some embodiments, the obtuse angle is 150 degrees. In some embodiments, the obtuse angle is 155 degrees. In some embodiments, the obtuse angle is 160 degrees.

In some embodiments, the obtuse angle is greater than 105 degrees. In some embodiments, the obtuse angle is greater than 110 degrees. In some embodiments, the obtuse angle is greater than 115 degrees. In some embodiments, the obtuse angle is greater than 116 degrees. In some embodiments, the obtuse angle is greater than 117 degrees. In some embodiments, the obtuse angle is greater than 118 degrees. In some embodiments, the obtuse angle is greater than 118.5 degrees. In some embodiments, the obtuse angle is greater than 119 degrees. In some embodiments, the obtuse angle is greater than 120 degrees. In some embodiments, the obtuse angle is greater than 125 degrees. In some embodiments, the obtuse angle is greater than 130 degrees. In some embodiments, the obtuse angle is greater than 135 degrees. In some embodiments, the obtuse angle is greater than 140 degrees. In some embodiments, the obtuse angle is greater than 145 degrees. In some embodiments, the obtuse angle is greater than 150 degrees. In some embodiments, the obtuse angle is greater than 155 degrees. In some embodiments, the obtuse angle is greater than 160 degrees.

In some embodiments, the obtuse angle is less than 105 degrees. In some embodiments, the obtuse angle is less than 110 degrees. In some embodiments, the obtuse angle is less than 115 degrees. In some embodiments, the obtuse angle is less than 116 degrees. In some embodiments, the obtuse angle is less than 117 degrees. In some embodiments, the obtuse angle is less than 118 degrees. In some embodiments, the obtuse angle is less than 118.5 degrees. In some embodiments, the obtuse angle is less than 119 degrees. In some embodiments, the obtuse angle is less than 120 degrees. In some embodiments, the obtuse angle is less than 125 degrees. In some embodiments, the obtuse angle is less than 130 degrees. In some embodiments, the obtuse angle is less than 135 degrees. In some embodiments, the obtuse angle is less than 140 degrees. In some embodiments, the obtuse angle is less than 145 degrees. In some embodiments, the obtuse angle is less than 150 degrees. In some embodiments, the obtuse angle is less than 155 degrees. In some embodiments, the obtuse angle is less than 160 degrees.

In some embodiments, the obtuse angle is an angle greater than 90 degrees, and less than 180 degrees.

Figure 4A:
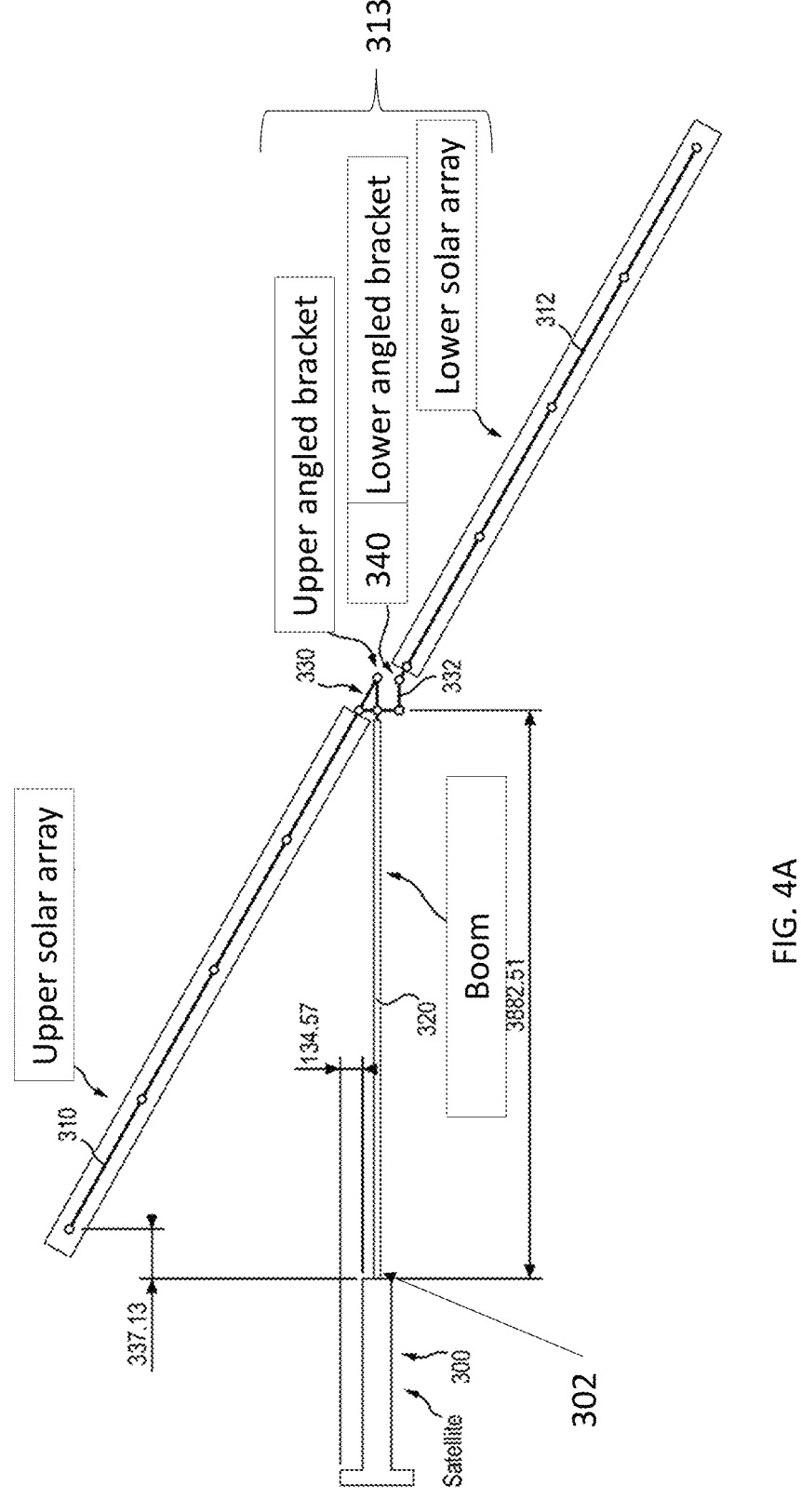
FIG. 4A shows a side view of a space vehicle with solar arrays in a deployed position, in accordance with some embodiments of the invention.
Figure 4B:
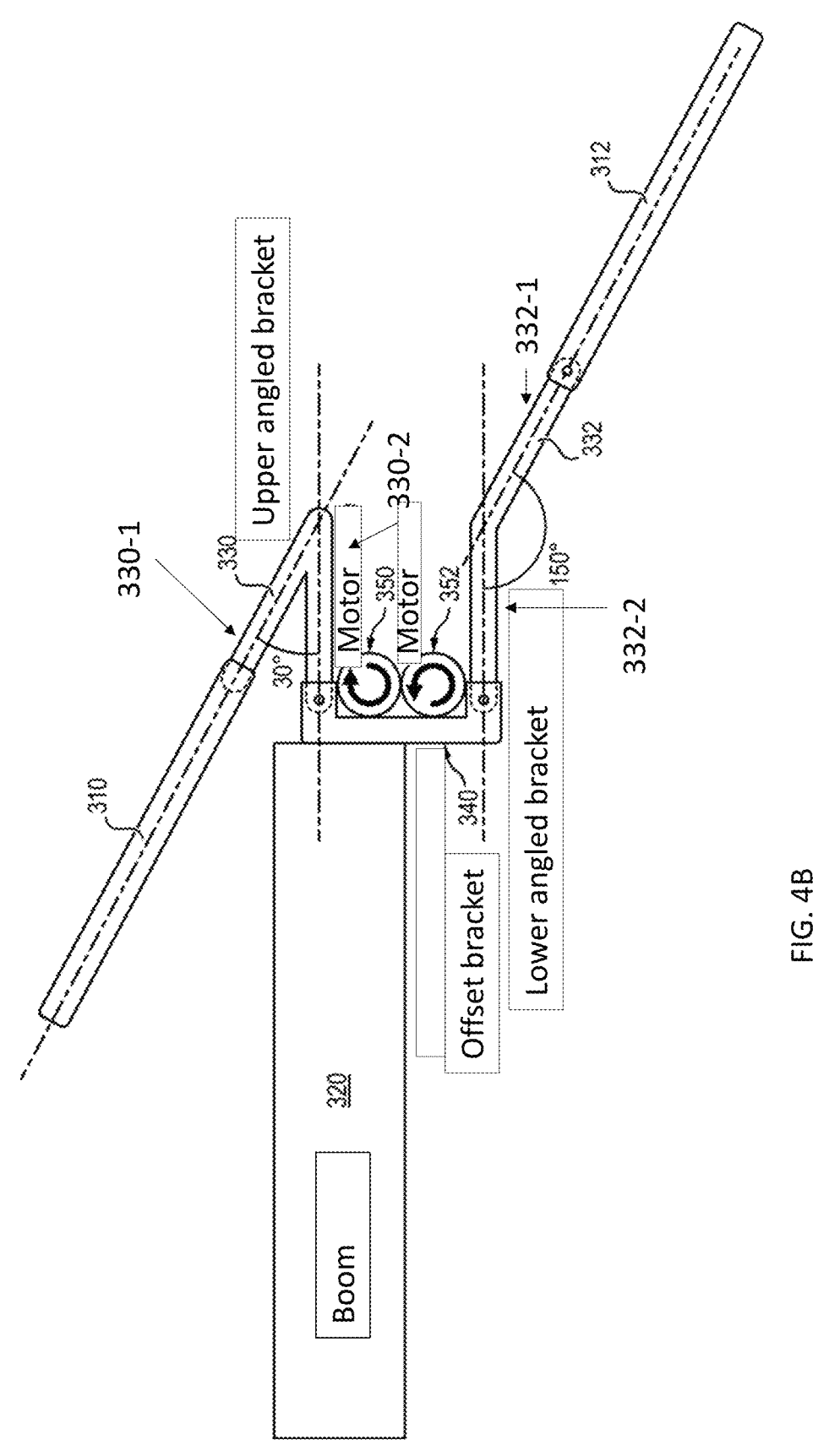
FIG. 4B shows a detail view of a portion of the space vehicle shown in FIG. 4A, in accordance with some embodiments of the invention.

FIG. 4A shows the satellite 300 of FIG. 3A with the upper and lower solar arrays 310, 312 deployed (that is, unfolded), while FIG. 4B shows a magnified view of the same portions shown in FIG. 3B with the upper and lower solar arrays 310, 312 deployed, in accordance with some embodiments of the invention.

In some embodiments, to deploy the upper and lower solar arrays 310, 312 of the satellite 300, the following sequence of steps may be followed. First, the upper and lower solar arrays 310, 312, which are releasably locked to the body of the satellite 300 when in the stowed position, may be released from the body of the satellite. Second, the boom 320 may be unlocked. Third, the boom 320 may be extended from its collapsed or stowed position (as shown in FIGS. 3A and 3B) to its extended position (as shown in FIG. 4A). Fourth, the boom 320 may be locked in its extended position, as shown in FIG. 4A. Fifth, the upper and lower brackets 330, 332 may be unlocked from their position as shown in FIG. 3B. Sixth, the upper and lower brackets 330, 332 may transition from their stowed position to their deployed position. In some embodiments, as shown in FIGS. 3B and 4B, the root motors 350, 352 may transition the upper and lower brackets 330, 332 between the stowed and deployed positions or orientations. In some embodiments, the upper and lower brackets 330, 332 may be biased, such as spring-biased, to their deployed position. Seventh, the upper and lower brackets 330, 332 may be locked into their deployed position. Eighth, the upper and lower solar arrays 310, 312 may be deployed. In some embodiments, the upper and lower solar arrays 310, 312 may be biased, such as spring-biased, from their stowed positions to their respective deployed positions and may be retained in their stowed positions using a locking mechanism, which is released to deploy the upper and lower solar arrays 310, 312. One or more, or all, of the above steps may be performed concurrently—that is, one or more, or all, of the steps may be carried out in parallel.

In some embodiments, the upper and lower brackets 330, 332, and/or the offset bracket 340, are sized, shaped, and/or positioned to orient the respective upper and lower solar arrays 310, 312 to, between, and/or among one or more predetermined angles. In some embodiments, the predetermined angle is selected to maximize electricity generation by the solar panels. In some embodiments, the predetermined angle is selected to generate a predetermined amount of electricity by the solar panels. In some embodiments, the predetermined angle depends on the altitude at which the satellite 300 is intended to operate.

In some embodiments, the predetermined angle is between from 15 degrees to 45 degrees from zenith for a satellite operated at an altitude of about 1,200 km. In some embodiments, the predetermined angle is between from 20 degrees to 45 degrees from zenith for a satellite operated at an altitude of about 1,200 km. In some embodiments, the predetermined angle is between from 25 degrees to 45 degrees from zenith for a satellite operated at an altitude of about 1,200 km. In some embodiments, the predetermined angle is between from 28 degrees to 45 degrees from zenith for a satellite operated at an altitude of about 1,200 km. In some embodiments, the predetermined angle is between from 28.5 degrees to 45 degrees from zenith for a satellite operated at an altitude of about 1,200 km. In some embodiments, the predetermined angle is between from 30 degrees to 45 degrees from zenith for a satellite operated at an altitude of about 1,200 km. In some embodiments, the predetermined angle is between from 35 degrees to 45 degrees from zenith for a satellite operated at an altitude of about 1,200 km. In some embodiments, the predetermined angle is between from 40 degrees to 45 degrees from zenith for a satellite operated at an altitude of about 1,200 km.

In some embodiments, the predetermined angle is between from 15 degrees to 40 degrees from zenith for a satellite operated at an altitude of about 1,200 km. In some embodiments, the predetermined angle is between from 20 degrees to 40 degrees from zenith for a satellite operated at an altitude of about 1,200 km. In some embodiments, the predetermined angle is between from 25 degrees to 40 degrees from zenith for a satellite operated at an altitude of about 1,200 km. In some embodiments, the predetermined angle is between from 28 degrees to 40 degrees from zenith for a satellite operated at an altitude of about 1,200 km. In some embodiments, the predetermined angle is between from 28.5 degrees to 40 degrees from zenith for a satellite operated at an altitude of about 1,200 km. In some embodiments, the predetermined angle is between from 30 degrees to 40 degrees from zenith for a satellite operated at an altitude of about 1,200 km. In some embodiments, the predetermined angle is between from 35 degrees to 40 degrees from zenith for a satellite operated at an altitude of about 1,200 km.

In some embodiments, the predetermined angle is between from 15 degrees to 35 degrees from zenith for a satellite operated at an altitude of about 1,200 km. In some embodiments, the predetermined angle is between from 20 degrees to 35 degrees from zenith for a satellite operated at an altitude of about 1,200 km. In some embodiments, the predetermined angle is between from 25 degrees to 35 degrees from zenith for a satellite operated at an altitude of about 1,200 km. In some embodiments, the predetermined angle is between from 28 degrees to 35 degrees from zenith for a satellite operated at an altitude of about 1,200 km. In some embodiments, the predetermined angle is between from 28.5 degrees to 35 degrees from zenith for a satellite operated at an altitude of about 1,200 km. In some embodiments, the predetermined angle is between from 30 degrees to 35 degrees from zenith for a satellite operated at an altitude of about 1,200 km.

In some embodiments, the predetermined angle is between from 15 degrees to 30 degrees from zenith for a satellite operated at an altitude of about 1,200 km. In some embodiments, the predetermined angle is between from 20 degrees to 30 degrees from zenith for a satellite operated at an altitude of about 1,200 km. In some embodiments, the predetermined angle is between from 25 degrees to 30 degrees from zenith for a satellite operated at an altitude of about 1,200 km. In some embodiments, the predetermined angle is between from 28 degrees to 30 degrees from zenith for a satellite operated at an altitude of about 1,200 km. In some embodiments, the predetermined angle is between from 28.5 degrees to 30 degrees from zenith for a satellite operated at an altitude of about 1,200 km.

In some embodiments, the predetermined angle is between from 15 degrees to 28.5 degrees from zenith for a satellite operated at an altitude of about 1,200 km. In some embodiments, the predetermined angle is between from 20 degrees to 28.5 degrees from zenith for a satellite operated at an altitude of about 1,200 km. In some embodiments, the predetermined angle is between from 25 degrees to 28.5 degrees from zenith for a satellite operated at an altitude of about 1,200 km. In some embodiments, the predetermined angle is between from 28 degrees to 28.5 degrees from zenith for a satellite operated at an altitude of about 1,200 km.

In some embodiments, the predetermined angle is between from 15 degrees to 28 degrees from zenith for a satellite operated at an altitude of about 1,200 km. In some embodiments, the predetermined angle is between from 20 degrees to 28 degrees from zenith for a satellite operated at an altitude of about 1,200 km. In some embodiments, the predetermined angle is between from 25 degrees to 28 degrees from zenith for a satellite operated at an altitude of about 1,200 km.

In some embodiments, the predetermined angle is between from 15 degrees to 25 degrees from zenith for a satellite operated at an altitude of about 1,200 km. In some embodiments, the predetermined angle is between from 20 degrees to 25 degrees from zenith for a satellite operated at an altitude of about 1,200 km. In some embodiments, the predetermined angle is between from 15 degrees to 20 degrees from zenith for a satellite operated at an altitude of about 1,200 km.

In some embodiments, the predetermined angle is 15 degrees from zenith for a satellite operated at an altitude of about 1,200 km. In some embodiments, the predetermined angle is 20 degrees from zenith for a satellite operated at an altitude of about 1,200 km. In some embodiments, the predetermined angle is 25 degrees from zenith for a satellite operated at an altitude of about 1,200 km. In some embodiments, the predetermined angle is 26 degrees from zenith for a satellite operated at an altitude of about 1,200 km. In some embodiments, the predetermined angle is 27 degrees from zenith for a satellite operated at an altitude of about 1,200 km. In some embodiments, the predetermined angle is 28 degrees from zenith for a satellite operated at an altitude of about 1,200 km. In some embodiments, the predetermined angle is 28.5 degrees from zenith for a satellite operated at an altitude of about 1,200 km. In some embodiments, the predetermined angle is 29 degrees from zenith for a satellite operated at an altitude of about 1,200 km. In some embodiments, the predetermined angle is 30 degrees from zenith for a satellite operated at an altitude of about 1,200 km. In some embodiments, the predetermined angle is 35 degrees from zenith for a satellite operated at an altitude of about 1,200 km. In some embodiments, the predetermined angle is 40 degrees from zenith for a satellite operated at an altitude of about 1,200 km. In some embodiments, the predetermined angle is 45 degrees from zenith for a satellite operated at an altitude of about 1,200 km.

In some embodiments, the predetermined angle is greater than 15 degrees from zenith for a satellite operated at an altitude of about 1,200 km. In some embodiments, the predetermined angle is greater than 20 degrees from zenith for a satellite operated at an altitude of about 1,200 km. In some embodiments, the predetermined angle is greater than 25 degrees from zenith for a satellite operated at an altitude of about 1,200 km. In some embodiments, the predetermined angle is greater than 26 degrees from zenith for a satellite operated at an altitude of about 1,200 km. In some embodiments, the predetermined angle is greater than 27 degrees from zenith for a satellite operated at an altitude of about 1,200 km. In some embodiments, the predetermined angle is greater than 28 degrees from zenith for a satellite operated at an altitude of about 1,200 km. In some embodiments, the predetermined angle is greater than 28.5 degrees from zenith for a satellite operated at an altitude of about 1,200 km. In some embodiments, the predetermined angle is greater than 29 degrees from zenith for a satellite operated at an altitude of about 1,200 km. In some embodiments, the predetermined angle is greater than 30 degrees from zenith for a satellite operated at an altitude of about 1,200 km. In some embodiments, the predetermined angle is greater than 35 degrees from zenith for a satellite operated at an altitude of about 1,200 km. In some embodiments, the predetermined angle is greater than 40 degrees from zenith for a satellite operated at an altitude of about 1,200 km. In some embodiments, the predetermined angle is greater than 45 degrees from zenith for a satellite operated at an altitude of about 1,200 km.

In some embodiments, the predetermined angle is less than 15 degrees from zenith for a satellite operated at an altitude of about 1,200 km. In some embodiments, the predetermined angle is less than 20 degrees from zenith for a satellite operated at an altitude of about 1,200 km. In some embodiments, the predetermined angle is less than 25 degrees from zenith for a satellite operated at an altitude of about 1,200 km. In some embodiments, the predetermined angle is less than 26 degrees from zenith for a satellite operated at an altitude of about 1,200 km. In some embodiments, the predetermined angle is less than 27 degrees from zenith for a satellite operated at an altitude of about 1,200 km. In some embodiments, the predetermined angle is less than 28 degrees from zenith for a satellite operated at an altitude of about 1,200 km. In some embodiments, the predetermined angle is less than 28.5 degrees from zenith for a satellite operated at an altitude of about 1,200 km. In some embodiments, the predetermined angle is less than 29 degrees from zenith for a satellite operated at an altitude of about 1,200 km. In some embodiments, the predetermined angle is less than 30 degrees from zenith for a satellite operated at an altitude of about 1,200 km. In some embodiments, the predetermined angle is less than 35 degrees from zenith for a satellite operated at an altitude of about 1,200 km. In some embodiments, the predetermined angle is less than 40 degrees from zenith for a satellite operated at an altitude of about 1,200 km. In some embodiments, the predetermined angle is less than 45 degrees from zenith for a satellite operated at an altitude of about 1,200 km.

The exemplary embodiments described herein provide systems and methods for securing solar arrays during launch, and/or deploying the solar arrays once a space vehicle is in a predetermined location, such as in orbit. The exemplary embodiments provide a stowed configuration that enables the space vehicle to be positioned in a stack and allow for deployment to a predetermined angle with minimal active components, allowing weight to be minimized.

While a number of embodiments of the present invention have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

The invention claimed is:

1. A system, comprising:
a satellite;
a first solar array, wherein the first solar array comprises at least a first solar panel;
a second solar array,
wherein the second solar array comprises at least a second solar panel;
a boom having a first end and a second end opposite the first end,
wherein the first end connects to the satellite; and
a bracket assembly,
wherein the bracket assembly comprise a first bracket, a second bracket, and a third bracket,
wherein the first bracket connects the first solar array to the third bracket,
wherein the first bracket comprises a first section and a second section,
wherein the second section is angled relative to the first section, and
wherein an angle between the first section and the second section is an acute angle,
wherein the second bracket connects the second solar array to the third bracket, and
wherein the third bracket connects the first bracket and the second bracket to the second end of the boom,
wherein the bracket assembly is configured to reorient the first solar array and the second solar array from a stowed position to a deployed position, and
wherein in the deployed position, the first and second solar arrays are oriented at a predetermined angle.

2. The system of claim 1, wherein the boom comprises an extendable boom.

3. The system of claim 2, wherein the extendable boom comprises at least one telescoping tube.

4. The system of claim 3, wherein the extendable boom comprises a plurality of telescoping tubes.

5. The system of claim 1, wherein the first solar array further comprises a third solar panel, and
wherein the third solar panel is foldable relative to the first solar panel.

6. The system of claim 5, wherein the second solar array further comprises a fourth solar panel, and
wherein the fourth solar panel is foldable relative to the second solar panel.

7. The system of claim 1, wherein the satellite has a zenith side and an earth side,
wherein the zenith side is configured to face away from the earth when the satellite is in orbit around the earth,
wherein the earth side is configured to face toward the earth when the satellite is in orbit around the earth, and
wherein the first end of the boom is connected to the zenith side of the satellite.

8. The system of claim 1, wherein the bracket assembly further comprises a biasing mechanism, and
wherein the biasing mechanism is configured to bias at least one of the first bracket and the second bracket to the deployed position.

9. The system of claim 8, wherein the biasing mechanism comprises a spring-biasing mechanism,
wherein the spring-biasing mechanism comprises at least one spring urging the first bracket and the second bracket to the deployed position.

10. The system of claim 1, wherein the bracket assembly further comprises at least one motor,
wherein the at least one motor is operable to position at least one of the first solar array and the second solar array to the deployed position.

11. The system of claim 1, wherein the second bracket comprises a third section and a fourth section angled relative to the third section.

12. The system of claim 11, wherein an angle between the third section and the fourth section is an obtuse angle.

13. A method, comprising:
deploying a system to a predetermined altitude,
    wherein the system comprises:
        a satellite;
        a first solar array,
            wherein the first solar array comprises at least a first solar panel;
        a second solar array,
            wherein the second solar array comprises at least a second solar panel;
        a boom having a first end and a second end opposite the first end,
            wherein the first end connects to the satellite; and
        a bracket assembly,
            wherein the bracket assembly comprise a first bracket, a second bracket, and a third bracket,
            wherein the first bracket connects the first solar array to the third bracket,
                wherein the first bracket comprises a first section and a second section,
                wherein the second section is angled relative to the first section, and
                wherein an angle between the first section and the second section is an acute angle, wherein the second bracket connects the second solar array to the third bracket, and
                wherein the third bracket connects the first bracket and the second bracket to the second end of the boom; and
    reorienting the first bracket and the second bracket, thereby to move the first solar array and the second solar array from a stowed position to a deployed position,
        wherein in the deployed position, the first and second solar arrays are oriented at a predetermined angle.

14. The method of claim 13, wherein the boom comprises an extendable boom.

15. The method of claim 14, wherein the extendable boom comprises at least one telescoping tube.

16. The method of claim 13, wherein the predetermined angle is between 15 and 45 degrees from zenith.

17. The method of claim 13, wherein the bracket assembly further comprises a biasing mechanism, and
    wherein the biasing mechanism is configured to bias at least one of the first bracket and the second bracket to the deployed position.

18. The method of claim 13, wherein the bracket assembly further comprises at least one motor,
    wherein the at least one motor is operable to position at least one of the first solar array and the second solar array to the deployed position.

\* \* \* \* \*